UNITED STATES PATENT OFFICE 2,813,082
Patented Nov. 12, 1957

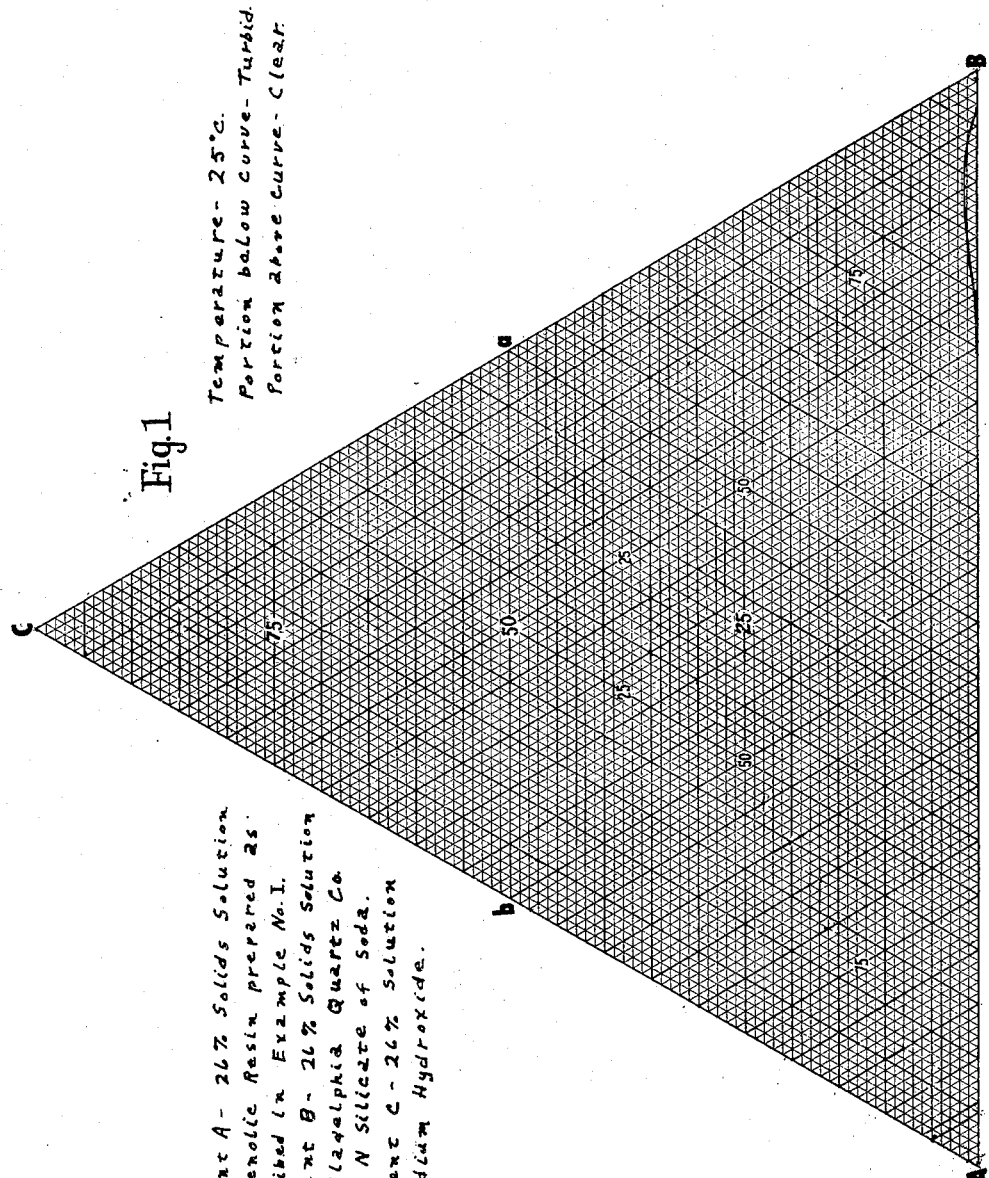

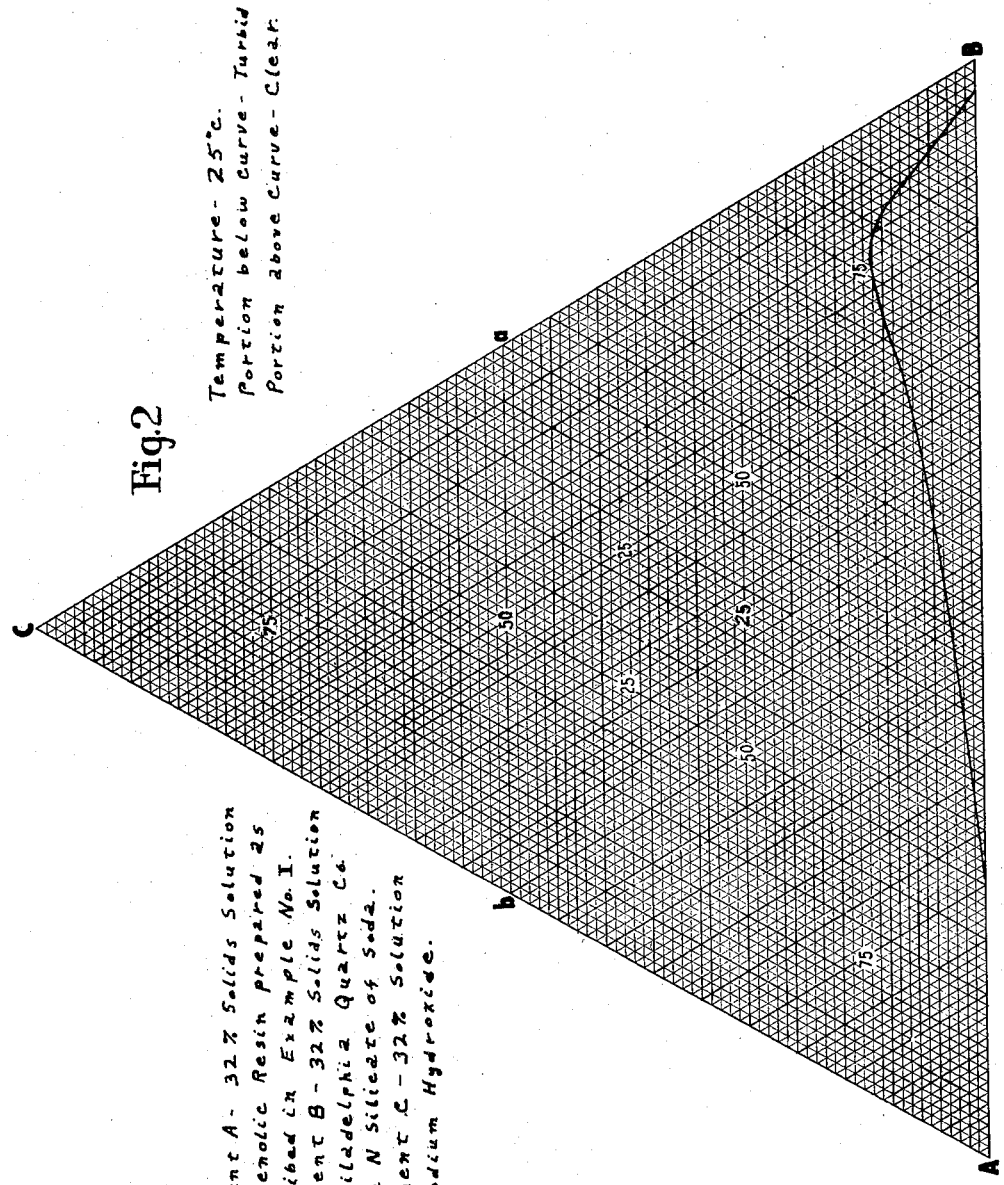

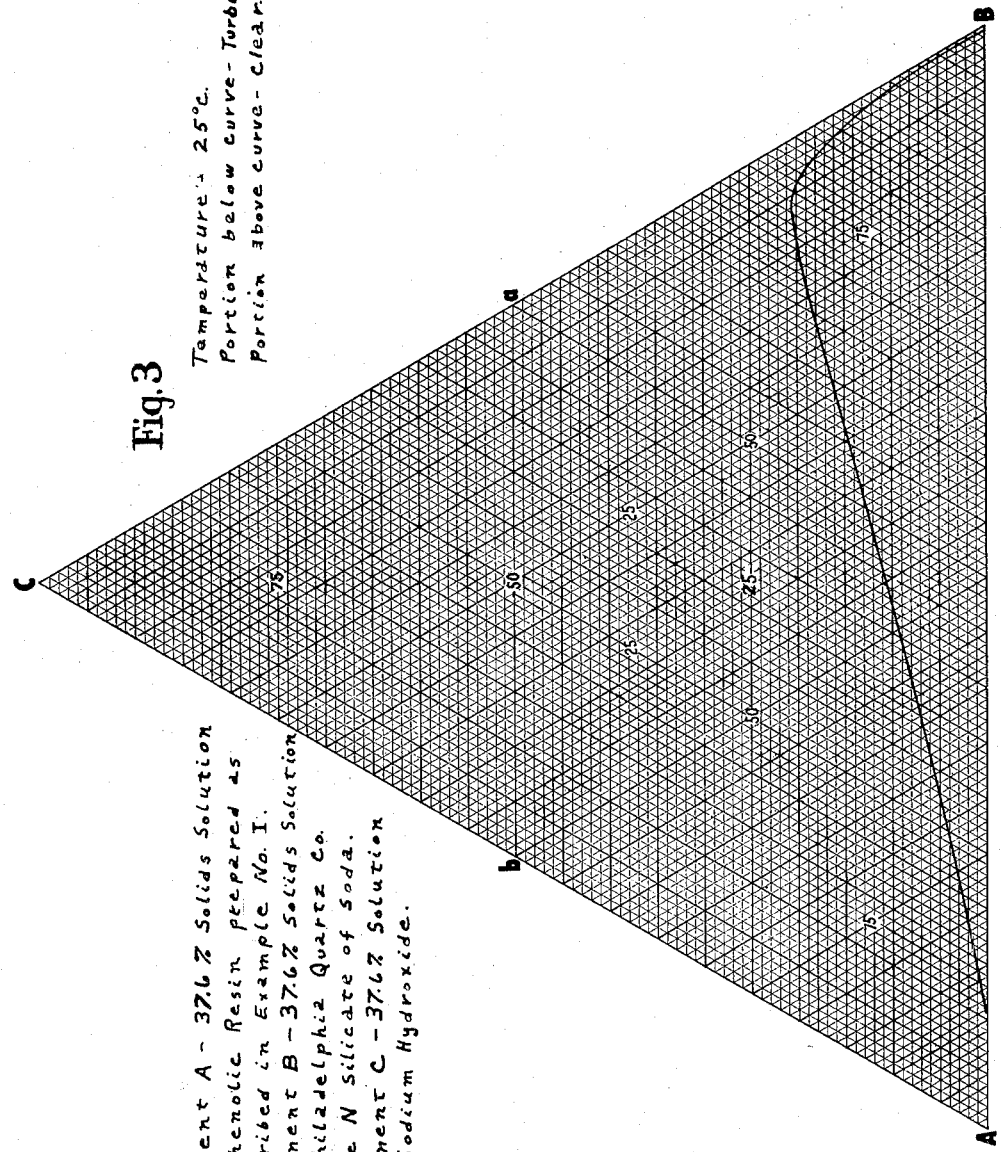

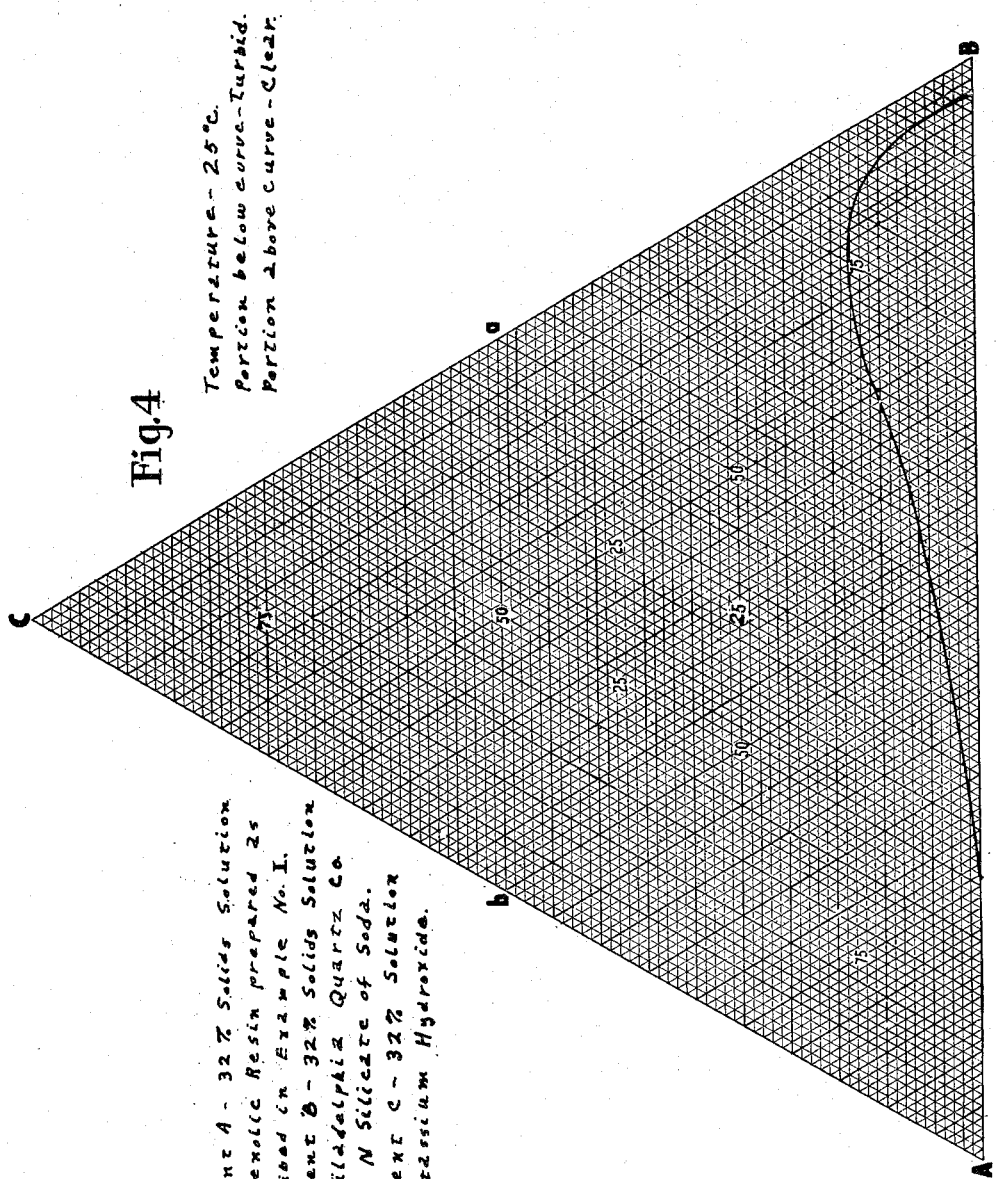

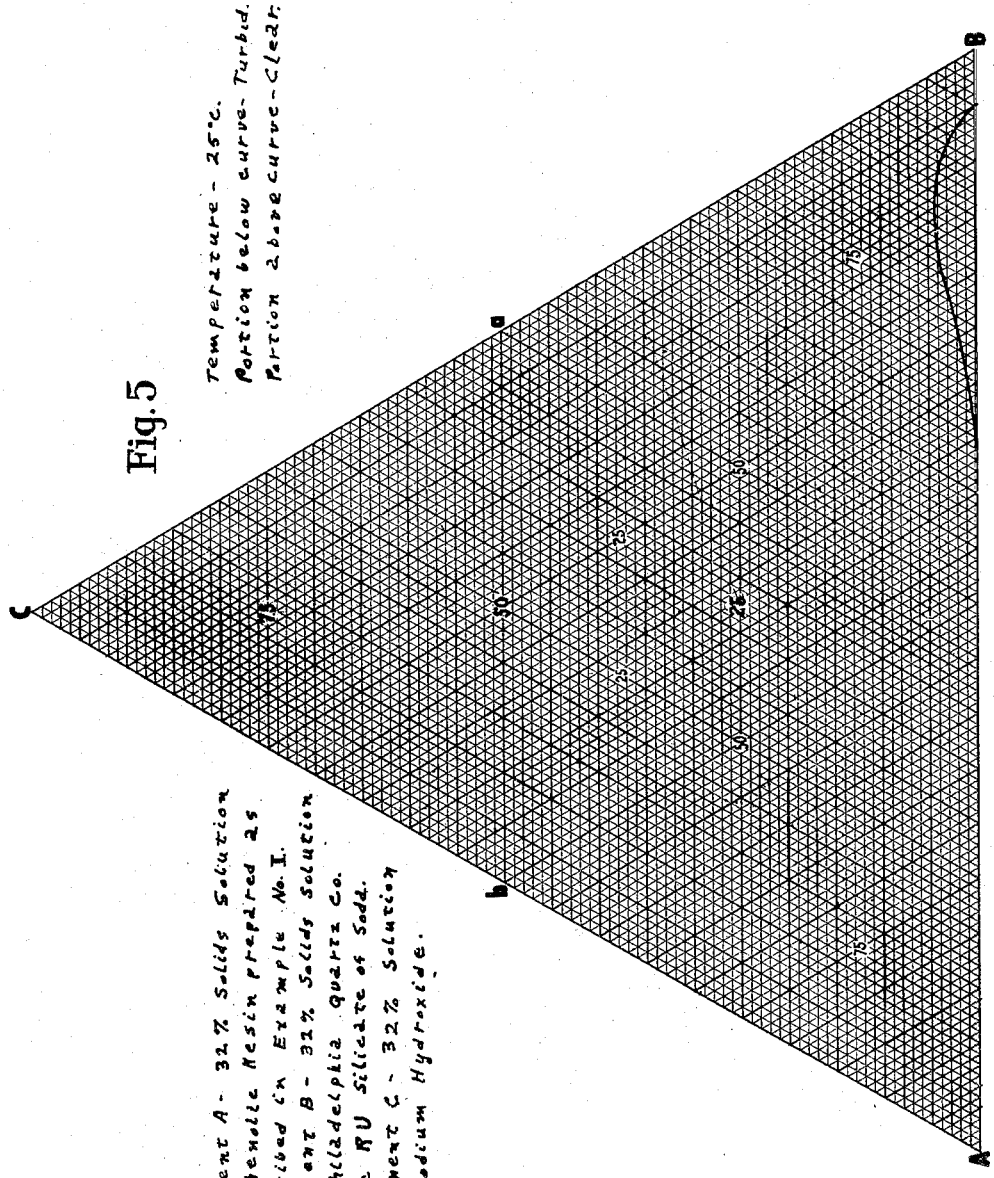

2,813,082

PRODUCTION OF ADHESIVE FROM MONO-HYDRIC PHENOL-ALDEHYDE RESIN AND SODIUM SILICATE

Donald V. Redfern and Gene F. Baxter, Seattle, Wash., assignors to American-Marietta Company, Adhesive, Resin and Chemical Division, Seattle, Wash., a corporation of Illinois Application November 5, 1953, Serial No. 390,340

15 Claims. (Cl. 260—7)

The present invention relates to the production of an adhesive composition primarily adapted for the gluing together or uniting of wooden members as, for example, plywood members.

The adhesive composition of the present invention comprises a homogeneous aqueous solution of a phenol-aldehyde condensation product and an alkali silicate, said components being maintained as a single solution, and being inhibited from separation in two layers by the incorporation into the solution of an alkaline hydroxide including sodium hydroxide, potassium hydroxide, lithium hydroxide, and ammonium hydroxide. In speaking of the phenol-aldehyde condensation product as being soluble in water, applicant is speaking of the salt of the resin as found in aqueous alkaline solution. If the solution is neutralized, then the neutral resin is for all practical purposes soluble both in water and in ethyl alcohol.

Some liquid solutions of a phenol-aldehyde resin which is soluble in water and a liquid solution of an alkali silicate, are not compatible one with the other, but separate into two immiscible aqueous layers. However, if an alkaline hydroxide as, for example, an alkali hydroxide and more specifically, sodium hydroxide, is incorporated in the mixture, there is no separation into two layers. The amount of resin solids taken on a dry basis present in the phenol-aldehyde condensation products and the alkalinity of the alkali silicate solution used influences the compatibility of these two components. However, when these components are mixed and turbidity appears and/or there is a separation into two layers, on the addition of the alkaline hydroxide the mixture becomes a homogeneous mixture, or if the three components are originally mixed together, the presence of the alkaline hydroxide, and preferably an alkali hydroxide which includes sodium hydroxide and ammonium hydroxide, insures a homogeneous solution.

The invention is applicable to an aqueous mixture of a phenol-aldehyde resinous condensation product and alkali silicate, the components of which are incompatible, causing the aqueous mixture thereof to exhibit turbidity. Upon the addition of a solution of an alkali hydroxide as, for example, sodium hydroxide, a homogeneous solution is produced.

The thermosetting phenol-aldehyde condensation product may be produced by condensing a monohydric phenol of the character herein set forth with an aldehyde in which the aldehyde is the sole reactive group. The resin is preferably the heat reaction-product of a phenol and an aldehyde, the molar ratio of the aldehyde to the phenol varying from 1:1 to 3:1, and in some cases the molar ratio may vary from 1:1 to 1.5:1.

The present invention may be carried out using a phenol-aldehyde condensation production of the character above set forth wherein the phenol is heat-reacted with formaldehyde. Monohydric phenol may be selected from the group of monohydric phenols having a distillation range between about 175° C. and about 225° C., said distillation range including phenol $C_6H_5OH$, the metacresols and the meta-xylenols. In general, the phenol-formaldehyde resin may be produced as set forth in Redfern Reissue Patent No. 23,347, granted March 20, 1951, and in U. S. Patents No. 2,631,097 and No. 2,631,098, both granted March 10, 1953, to American-Marietta Company, Adhesive, Resin and Chemical Division, as assignee of Donald V. Redfern.

In the Redfern reissue patent there is set forth a process of producing a thermosetting phenol-aldehyde resin condensation product comprising forming an aqueous mixture of a monohydric phenol selected from the group consisting of phenol, cresol, and xylenol, and an inorganic catalyst accelerating the formation of the resin-reaction product on heating, said catalyst being preferably sodium hydroxide, that is, caustic alkali, and when expressed as sodium hydroxide being present in an amount equivalent to not over 10% of the total mixed constituents, the molar ratio of the aldehyde, which may be formaldehyde, to the phenoy varying from about 1:1 to about 3:1. The aqueous solution of said ingredients is heat-reacted to produce a water-soluble phenol-aldehyde reaction-product, the viscosity of the latter increasing during the initial reaction period and being indicative of the advancement of the water-soluble reaction product towards a stage where the water-soluble state terminates, said aldehyde including formaldehyde retaining its activity during the formation of the water-soluble phenol-aldehyde reaction product. The viscosity of the latter and its tendency to progress to a water-insoluble reaction product is reduced by adding thereto an alkali metal hydroxide and specifically sodium hydroxide or caustic alkali, and further heating the water-soluble resin to a stage where an aqueous solution of the mass shows a precipitate upon the addition of ethanol, said condensation product being water-soluble, said alkali metal hydroxide increasing the pH of the finally condensed product to greater than neutrality, that is, greater than 7.5 and preferably between 7.5 or 8 and 14, inclusive.

In Redfern Patent No. 2,631,098 there is set forth a method of producing a thermosetting phenol-aldehyde condensation product comprising forming an aqueous mixture of a monohydric phenol selected from the group of phenols consisting of phenol per se, that is, $C_6H_5OH$, creasol, and xylenol, and an aldehyde in which the aldehyde group is the sole reactive group, said aldehyde being preferably formaldehyde, and an alkali catalyst accelerating the formation of the resin-reaction product on heating, said catalyst being preferably sodium hydroxide, which is herein defined as caustic alkali, said catalyst being present in an amount not over 10% taken on the weight of the phenol, the molar ratio of the aldehyde to the phenol varying from about 1:1 to about 1.5:1. This aqueous solution is heat-reacted until the resin-reaction product is substantially insoluble in its aqueous alkaline solution as evidenced by the solution becoming cloudy when a sample thereof is cooled to 25° C. There is then added to said cloudy solution an alkali metal hydroxide and more specifically sodium hydroxide, which solubilizes the resin-reaction product, and said product is then heat-reacted until the resin-reaction product again becomes insoluble in the aqueous alkaline solution as evidenced by a sample of said solution becoming cloudy when cooled to 25° C. After repeated alternate steps of heat-treating and further condensing the resin until the latter is insoluble in its alkaline solution, more metal hydroxide as, for example, sodium hydroxide, is added to resolubilize the resin in its aqueous alkaline solution, said final resin then being permanently ethanol-soluble and permanently soluble in its aqueous alkaline solution. More specifically, when the resin-reaction product becomes cloudy for the second time when cooled to 25° C., there is continued the alternate steps of adding alkali metal hydroxide to solubilize the resin in its alkaline solution and heat-treating and further condensing the resin until the latter is insoluble in its alkaline solution and is ethanol-soluble.

In Patent No. 2,631,098 there is set forth a modified method of producing the resin condensation product. This modified method is herein set forth as method P, said method comprising forming an aqueous mixture of a monohydric phenol preferably having a distillation range between about 175° C. and about 225° C., said phenol also being preferably selected from the group consisting of phenol per se, cresol, and xylenol, and an aldehyde in which the aldehyde group is the sole reactive group, said aldehyde being preferably formaldehyde, and an alkali catalyst accelerating the formation of the resin-reaction product on heating, said catalyst being preferably sodium hydroxide which is herein defined as caustic alkali, said catalyst being present in an amount not over 10% taken on the weight of the phenol, the molar ratio of the aldehyde to the phenol varying from about 1:1 to about 1.5:1. This aqueous solution is heat-reacted until the resin-reaction product is substantially insoluble in its aqueous alkaline as evidenced by the solution becoming cloudy when a sample thereof is cooled to 25° C. There is then added to said cloudy solution an alkali metal hydroxide and more specifically sodium hydroxide, which solubilizes the resin-reaction product, and said product is then heat-reacted until the resin-reaction product again becomes insoluble in the aqueous alkaline solution as evidenced by a sample of said solution becoming cloudy when cooled to 25° C. It is to be noted that method P up to this point is similar to method N. However, after the solution has become cloudy when a sample thereof is cooled to 25° C., there is continued the alternate steps of adding alkali metal hydroxide as, for example, sodium hydroxide, to solubilize the resin in its alkaline solution and heat-treating and further condensing the resin until the latter is insoluble in its alkaline solution and is ethanol-soluble. Thereafter, the condensation of the resin is continued until the latter is no longer insoluble in its aqueous alkaline solution, but the viscosity of the resin increases. Thereafter, the resulting alkaline solution of the resin is subjected to repeated additions of alkaline metal hydroxide with a condensation step in between each addition of alkali metal hydroxide, each addition thereof functioning to decrease the viscosity of the resin solution which was increased by the condensation step.

The present invention also resides in the production of a cellulose mass comprising individual cellulose components bonded at a hot-press temperature of about between 200° F. and 300° F. with the thermosetting adhesive composition herein set forth comprising a homogeneous aqueous solution of a thermosetting phenol-aldehyde resin and an alkali silicate as, for example, sodium silicate, in which there has been incorporated a solution of sodium hydroxide for the purpose of preventing the solution from separating into a plurality of layers. It may be stated that it has been discovered that the incorporation of the alkaline hydroxide as, for example, sodium hydroxide, in the adhesive composition produces a plywood of better strength, as hereinafter more particularly pointed out.

In one form of the present invention, a method is provided for the production of an adhesive composition, said method comprising inhibiting the separation into aqueous layers of an aqueous mixture of a thermosetting heat-reacted resinous reaction product of a phenol and an aldehyde in which the aldehyde group is a sole reactive group, an alkali silicate, blood in an amount to thicken the composition in the presence of the alkali silicate, and the alkaline hydroxide, and a blood anti-oxidation agent which inhibits or reduces the tendency of the blood to oxidize during spreading of the adhesive on use thereof, said method comprising incorporating in the mixture an aqueous solution of an alkaline hydroxide as, for example, an alkali hydroxide including sodium, potassium or lithium hydroxide.

It has been discovered that the presence of blood in the composition above set forth serves to allow a shorter pressing time for the homogeneous resinous composition of controlled viscosity as hereinafter set forth, in that the resin adhesive sets more rapidly and therefore aids in the formation of an initial bond. In the place of blood, other protein material may be used as, for example, soy bean meal.

It is also within the province of the present invention to incorporate in the adhesive mixture lime or calcium hydroxide to improve the water resistance of the blood.

It may be pointed out that the concentration of the aqueous solution of the thermosetting phenol-aldehyde condensation product, that is, the concentration of the alkaline salt which is present in the alkaline solution, appears to have some bearing upon the compatibilty or incompatibility of the phenol-aldehyde condensation product with the alkali silicate. In general, at high resin concentrations as, for example, above about 20 to about 45 or 50% solids, the resin is incompatible with the aqueous solution of the alkali silicate. Again, the amount of resin irrespective of the concentration of the aqueous solution of the resin which is mixed with the alkali silicate appears to affect the stability of the mixtures of the aqueous solutions of these two components or ingredients.

Regardless, thereof, however, when turbidity once appears, the turbidity can be removed by adding an alkaline hydroxide. Of course, while ammonium hydroxide can be used to effect the result, it is impracticable because it would be necessary to keep the solutions in sealed containers and this is not true when using the remainder of the alkaline hydroxides.

The invention will be specifically set forth in connection with the following examples:

EXAMPLE I

The following components are mixed together to produce an interior type resin glue:

250 parts phenol-formaldehyde condensation product
250 parts silicate of soda in which the alkali to silica ratio is 1:3.22 (grade N silicate of soda made by the Philadelphia Quartz Co.)
54 parts of 50% NaOH solution
50 parts water
100 parts walnut shell flour
5 parts pine oil The phenol-formaldehyde condensation product and the silicate of soda each contain approximately 40% solids.

If the concentrations of the thermosetting resin and the sodium silicate in the above reaction mixture is held constant, and if the proportion of sodium hydroxide added is reduced, the mixture will become turbid.

The adhesive is very satisfactory for the preparation of interior grade hot-pressed plywood having a viscosity of 43 on a McMichael viscosimeter using a No. 30 wire and 20 R. P. M. rotation; has good spreading properties, and produces panels which pass the 10-cycle interior test (see Commercial Standard CS 45–47 for Douglas Fir Plywood, U. S. Department of Commerce, paragraph 25) using 3-ply 7/16" Douglas fir construction with 1/8" faces; 60 lbs. wet spread per 1000 sq. ft. of double glue line; and 8 minutes pressing time at 200 lbs. per sq. in. pressure, and 285° F. platen temperature, the panels being pressed 2 per press opening and subsequently stacked until cool.

The phenol-aldehyde thermosetting resin used in Example I is produced by the following specific procedure herein designated procedure A. Mix together at 25° C. the following ingredients or parts being by weight:

25.73 parts phenol (90%)
40.17 parts 37% formaldehyde
9.40 parts 50% sodium hydroxide
20.60 parts water Bring the temperature of the mixture to 98° C. in 110 minutes with a uniform temperature rise. Reflux for 35 minutes. Cool to 88° C. in a period of 20 minutes. Hold at 88° C. until the viscosity reaches 3 to 3.2 poises at 25° C. Cool to 75° C. in the next 20 minutes by which time the viscosity should be 4.7 to 5.5 poises at 25° C. Hold at 75° C. until the viscosity reaches 6 to 6.3 poises at 25° C. and add 2.20 parts by weight 50.00% NaOH. Allow the temperature to rise 78° C. and the viscosity to increase to 3.5 to 3.7 poises. Add 1.90 parts by weight 50.00% NaOH. Cool to room temperature.

EXAMPLE II

The following is an example of an exterior type adhesive made by using sodium silicate in combination with a phenol-aldehyde resin, glue mix No. IIA utilizing the same resin without sodium silicate and sodium hydroxide. Glue mix No. IIB does utilize the composition of the present invention comprising the thermosetting resin sodium silicate which has been clarified with sodium hydroxide.

Glue mix No. IIA:
  500 parts phenol-aldehyde condensation product
  80 parts walnut shell flour
  80 parts water
Glue mix No. IIB:
  500 parts phenol-aldehyde condensation product
  125 parts sodium silicate (grade N Philadelphia Quartz Co.), alkali-to-silica ratio of 1:3.22
  80 parts walnut shell flour
  80 parts water
  40 parts 50% NaOH Referring to glue mix IIB, 500 parts of the resin are mixed with 125 parts of the grade N sodium silicate solution and then there is added 40 parts of 50% aqueous solution. Upon stirring, the mixture clarifies itself.

In preparing each glue mix, the parts of which are all taken by weight, the ingredients were added separately in the order named with thorough stirring after each addition. The two finished glues were indistinguishable in appearance and working properties, and each had a viscosity of 6 to 7 on a McMichael viscosimeter, using a No. 30 wire and 20 R. P. M. rotation.

Laboratory tests were conducted in which 3-ply Douglas fir plywood panels were prepared with the two glues under exactly parallel conditions, using 7/16" construction with 1/8" faces and 3/16" cores; 60 lbs. spread per 100 sq. ft. of plywood; 200 lbs. per sq. in. pressure; and 285 F. platen temperature. The assembly times ranged from 3 to 30 min. and the pressing time was 7 min. for two panels per press opening. When submitted to the boiling test (see Commercial Standard CS 45-47 for Douglas Fir Plywood, U. S. Department of Commerce, paragraph 26b), the panels made with glue mix No. IIA averaged 90% wood failure and 132 lbs. per sq. in. shear strength, whereas those glued with mix No. IIB averaged 95% wood failure and 133 lbs. per sq. in. shear strength.

This conclusively proves that the silicate-modified adhesive of the present invention in addition to being less expensive than the conventional type adhesive, also gives better exterior glue or adhesive joints.

In addition, test specimens of the panels glued with mix No. IIB were submitted to weathering tests by being placed on a southern exposure test-fence in Seattle, Washington, inclined at a 45 degree angle. In 667 days' time of such exposure, none of the panels has shown any delamination.

Another series of Douglas fir plywood panels was made with glue mix No. IIB in an experimental trial at a plywood mill, under commercial conditions. The construction was 5-ply 13/16" with 5/32" faces, centers, and cores; the pressing cycle was 3 minutes at 200 p. s. i. and 5 min. at 165 p. s. i., or a total of 8 min. at 285° F.; the spread ranged from 60 to 69 lbs. per 1000 sq. ft. of double glue line; and the assembly times ranged from 4 to 18 min. Test specimens subjected to the boiling test gave average results of 143 p. s. i. shear strength and 73% wood failure. Corresponding specimens exposed for 332 days on the test fence and then subjected to the boiling test gave average results of 133 p. s. i. shear strength and 98% wood failure. This shows that the waterproofness of the glue joints is very good and that weathering actually improves the bonds rather than being detrimental to them.

The phenol-aldehyde thermosetting resinous condensation product set forth in Example II was prepared by the following procedure which is herein designated procedure B, the ingredients being parts by weight:

*Preparation of resin B*

Mix together at 25° C.:
  25.40 parts 90.00% phenol
  8.66 parts 50.00% NaOH
  40.60 parts 37.00% formaldehyde
  18.90 parts water Raise the temperature to refluxing in 100 minutes with a uniform temperature rise. Reflux for 35 minutes. Reduce the temperature to 82° C. at a constant rate over a period of 35 minutes, at the end of which time the viscosity should be between 3 and 3.2 poises. (All viscosity measurements are at 25° C.) Hold at 82° C. until the viscosity reaches 6.3 poises. Cool at a constant rate to 72° C. in the next 35 minutes. The viscosity is preferably maintained at about 17½ poises at this point. Hold at 72° C. until the viscosity reaches 26 poises, wait 15 minutes more, and add 2.04 parts by weight 50.00% NaOH. Cool to 40° C. at a constant rate in the next 80 minutes, and add 4.40 parts by weight 50.00% NaOH. After 10 minutes, cool to room temperature. The final viscosity varies between 2 and 2.5 poises.

EXAMPLE III

The present example shows the formulation of an interior type glue in which the broad composition of the present invention, namely, the homogeneous clarified aqueous adhesive solution containing a phenol-aldehyde condensation product, an alkali silicate and sodium hydroxide has incorporated therein soluble blood. The interaction of the thermosetting phenol-aldehyde resin, the alkali silicate and the blood in an alkaline medium produces a thickening effect which allows an increased amount of water to be added to the adhesive, thereby producing an adhesive with good working properties. It is desired to point out that while in general it is known that soluble blood does function to thicken an aqueous solution of a thermosetting phenol-aldehyde condensation product, the thickening action is not sufficient to obtain the desired properties, namely a considerable thickening. However, when the sodium silicate is present, the presence of a protein, and especially blood, as, for example, soluble blood, functions to produce a final adhesive or glue of the desired properties. In order that it may be clear what effect is produced by the incorporation of the blood in an adhesive formulation in accordance with the present invention, two mixes are herein set forth, namely, mixes III A and III B; mix III A having sodium silicate present; and mix III B being substantially identical with mix III A with the exception that the sodium silicate is not present.

Mix III A:
- 500 parts thermosetting phenol-aldehyde condensation resin
- 125 parts Philadelphia Quartz Co. grade N sodium silicate having an alkali to silica ratio of 1 to 3.22
- 125 parts dry mixture of 1 part commercial soluble blood and 1 part walnut shell flour
- 40 parts 50% aqueous NaOH
- 500 parts water
- 2½ parts diesel oil Mix III B:
- 500 parts thermosetting phenol-aldehyde condensation resin
- 125 parts dry mixture of 1 part commercial soluble blood and 1 part walnut shell flour
- 40 parts 50% aqueous NaOH
- 500 parts water
- 2½ parts diesel oil
- 27¼ parts Bentonite clay The ingredients are added separately in the order named and thorough mixing accomplished after each addition. The final viscosity is about 15 on a No. 30 McMichael wire at 20 R. P. M. for mix No. III A and about 2 for No. III B. The Bentonite clay was added to mix No. III B to give it enough body for spreading on a plywood spreader.

In an experiment in which 3 ply $7/16''$ Douglas fir plywood panels with $1/8''$ faces and $3/16''$ cores were prepared with the two glues under exactly parallel conditions using 200 p. s. i. pressure, 285° F. platen temperature, 2 panels per press opening, 55 lbs. spread per 1000 sq. ft. of plywood, 7 min. assembly time, and pressing times ranging from 6.5 to 7.5 min.; all the test specimens passed the 10-cycle interior test. In addition, other test pieces were subjected to the boiling test and yielded average results of 82% wood failure and 99 lbs. per sq. in. shear strength for mix No. III A and 45% wood failure and 91 lbs. per sq. in. shear strength for mix No. III B.

Mix No. III B has been approved by the Douglas Fir Plywood Association for use in gluing interior grade plywood.

The phenol-aldehyde condensation product used in mixes III A and III B was prepared by procedure B up to the point where the second portion of the caustic alkali is added. Then the procedure is as follows: maintain the temperature of the reaction mix at 72° C. until the viscosity reaches about 9½ poises, then raise the temperature to 75° C. in the next five minutes. Hold at 75° C. for thirteen minutes, then add the third caustic portion. Allow the temperature to rise to 77° C. in the next four minutes. Then cool to 40° C. at a uniform rate in the next eighty-three minutes. Thereafter, cool to 25° C. The final viscosity is preferably between 3 and 3.2 poises. The resin used in mixes III A and III B had advanced to a viscosity of 345 poises, said viscosity having increased by ageing at room temperature.

EXAMPLE IV

The following is an example of an exterior glue of the same type as shown in Example III except that a larger proportion of blood is used for the purpose of allowing a shorter pressing time. The water resistance of the blood is improved by the incorporation of lime or calcium hydroxide in the mix. The tendency of the blood to oxidize during the spreading of the adhesive or glue is inhibited and substantially reduced or entirely reduced by having present in the mix sodium sulfite. The sodium sulfite in the resin-blood-silicate adhesive of the present invention functions to prevent or delays the tendency of the adhesive to develop a gel consistency upon a prolonged agitation on a spreader or in a mixer. It seems probable that certain constituents of bovine serum albumen present in the blood are oxidized by agitation, and it is this oxidation that produces the gelation. In the strongly alkaline mixture, the bisulfite is, of course, almost at once converted into the sulfite. The invention is not limited to the use of the sodium acid sulfite in the resin-silicate-blood sodium hydroxide adhesive. Other reducing agents which may be used are cysteine, thioglycolic acid, thioglycol, and cyanide.

Mix together at 25° C. the following ingredients, the parts being all parts by weight:

- 333 parts extender composed of 39.60% commercial soluble blood, 51.68% walnut shell flour, 2.77% NaHSO₃, 4.95% insoluble blood, and 1.00% pine oil
- 11 parts pine oil
- 53 parts 50% NaOH
- 500 parts thermosetting phenol-formaldehyde resin
- 333 parts Philadelphia Quartz Co. grade N sodium silicate having an alkali to silica ratio of 1:3.22
- 100 parts 33% aqueous lime suspension
- 1000 parts water This resulting mix has a viscosity of about 60 on a McMichael viscosimeter, using a No. 26 wire and 20 R. P. M. rotation. In laboratory tests in which 3-ply $7/16''$ Douglas fir plywood panels with $1/8''$ faces and $3/16''$ cores were pressed 2 per press opening using 55 to 60 lbs. spread per 1000 sq. ft. of plywood, 200 p. s. i., 285° F., pressing times ranging from 4.5 to 5.5 min., and assembly times ranging from 3 to 30 min.; 91.7% of test specimens passed the 10-cycle interior test. This mix is approved by the Douglas Fir Plywood Association for gluing interior grade plywood.

The thermosetting phenol-formaldehyde condensation product was prepared by the procedure herein previously set forth and identified as procedure A.

EXAMPLE V

The following is an example wherein the adhesive composition is prepared with a protein material other than blood. In this example, the protein material is soy bean:

- 1000 parts soymeal base composition
- 4000 parts water (½ initially, mix, then add 2nd ½)
- 180 parts 33⅓% aqueous NaOH
- 400 parts thermosetting phenol-aldehyde condensation product
- 360 parts aqueous lime suspension
- 250 parts Philadelphia Quartz Co. grade N sodium silicate having an alkali to silica ratio of 1:3.22
- 15 parts mixture of 3 parts CS₂ and 1 part CCl₄
- 250 parts water The above set forth soymeal base composition comprises the following, parts being parts by weight:

- 88.75 parts soymeal
- 1.00 part trisodium phosphate
- 2.00 parts sodium fluoride
- 5.25 parts milorganite
- 3.00 antifoam agent The antifoam agent used is set forth in U. S. Patent No. 2,524,309, granted October 3, 1950, to Bernard B. Coyne, and comprises as there set forth a dispersed mixture of an alkaline earth stearate, pine oil and a petroleum distillate having a boiling point between that of gasoline and SAE No. 30 lubricating oil; in which mixture the stearate constitutes from about 1.0% to 12.0% by weight of the mixture, and the remainder of the mixture comprises pine oil and petroleum distillate in the ratio of 1:1 to 7:1.

"Milorganite" is defined by Hackh in his Chemical Dictionary, 1944, page 540, as follows: "An organic fertilizer prepared in Milwaukee by the dehydration of sewage. A brown granular powder resembling coffee grounds, free from bacteria and seeds, and containing 5.4% N and 3% H₃PO₄."

The ingredients in Example V are added separately in the order named and thorough mixing accomplished after each addition. The final viscosity is about 30 on a McMichael viscosimeter using a No. 26 wire and 20 R. P. M. rotation. In laboratory tests in which 3 ply 7/16" Douglas fir plywood panels were prepared using 1/8" faces and 3/16" cores, 70–80 lbs. wet spread per 1000 sq. ft. of plywood, 6 to 7 min. pressing time, 200 lbs. per sq. in. pressure, and 285° F. platen temperature, with panels pressed 2 per press opening and subsequently stacked until cool, 96% of the test specimens passed the 10-cycle interior test.

The phenol-aldehyde resin set forth in Example V was prepared by the hereinbefore set forth procedure B.

Further examples of the present invention are as follows:

EXAMPLE VI

An alkaline solution of phenol-aldehyde resin prepared as set forth in procedure A, and containing 26% solids is mixed with a sodium silicate solution containing 26% solids, said sodium silicate being grade N silicate prepared by the Philadelphia Quartz Co. and having an alkali to silica ratio of 1:3.22. To this was added a 26% solution of sodium hydroxide, said resin, silicate of soda, and sodium hydroxide components being designated components A, B and C. The results obtained with various mixtures are set forth in Fig. 1 of the accompanying drawing.

EXAMPLE VII

The same experiment was repeated, the resin component A having 32% solids, the resin component B having 32% solids, and the resin component C having 32% solids. The results obtained are shown in Fig. 2 of the drawing.

EXAMPLE VIII

The experiment was repeated with the same components, except that the solids of components were 37.6% and the sodium hydroxide had a concentration of 37.6% as shown by Fig. 3 of the drawing.

EXAMPLE IX

Fig. 4 of the drawing shows the results obtained when mixing components A, B and C, component C being a 32% solution of potassium hydroxide.

EXAMPLE X

Fig. 5 of the drawing shows the results obtained by mixing components A, B and C. Components A and B had 32% of solids in solution. The silicate of soda used in Example X is the RU silicate made by the Philadelphia Quartz Co., said silicate having an alkali to silica ratio of 1:2.4. As Fig. 5 shows less sodium hydroxide is required to produce homogeneity because of the higher alkalinity of the silicate.

EXAMPLE XI

Mixtures of 32% solutions of the resin and sodium silicate having an alkali to silica ratio of 1:1.58 were found to be compatible in all proportions without the addition of caustic. With higher total solid solutions, the mixture was not homogeneous in all proportions, and the addition of caustic was required.

EXAMPLE XII

Experiments were carried out mixing potassium silicate solution with the resin produced by procedure A, alkali potassium silicate having an alkali to silica ratio of 1:3.29. These mixtures were turbid, and were clarified by the addition of sodium hydroxide.

In experiments VI to XII inclusive, the resin which was mixed with the alkali silicate and the sodium or potassium hydroxide was prepared by the herein designated procedure A.

The following calculation sets forth the total amount of sodium hydroxide and the total amount of sodium silicate, the latter expressed as $SiO_2$, for each part of solid resin present in the compositions set forth in Examples I, IIB, IV and V, respectively:

EXAMPLE I

1. Parts NaOH from resin=parts resin×percent NaOH in resin/100=250 (.0675)=17
2. Parts NaOH from sodium silicate solution=parts sodium silicate solution×percent solids content of sodium silicate solution/100×percent $Na_2O$ in solids portion of grade used/100×factor to convert $Na_2O$ to NaOH=250 (.4) (.243) (1.29)=31.3
3. Parts NaOH added as such=27
4. Parts NaOH total=17+31.3+27=75.3
5. Parts solid resin=parts resin×percent solids content of resin/100=parts NaOH from resin=250 (.4) =17=83
6. Parts $SiO_2$=parts sodium silicate solution×percent solids content of sodium silicate solution/100×percent $SiO_2$ in solids portion of grade used/100=250 (.4) (.757)=75.7

EXAMPLE IIB

1. Parts NaOH from resin=500 (.0755)=37.7
2. Parts NaOH from sodium silicate solution=125 (.4) (.243) (1.29)=15.6
3. Parts NaOH added as such=20
4. Parts NaOH total=73.3
5. Parts solid resin=500 (.4)−38=162
6. Parts $SiO_2$=125 (.4) (.757)=37.8

EXAMPLE IV

1. Parts NaOH from resin=500 (.0675)=33.7
2. Parts NaOH from sodium silicate solution=333 (.4) (.243) (1.29)=41.7
3. Parts NaOH added as such=26.5
4. Parts NaOH total=101.9
5. Parts solid resin=500 (.4)−33.7=166
6. Parts $SiO_2$=333 (.4) (.757)=101

EXAMPLE V

1. Parts NaOH from resin=400 (.0755)=30.2
2. Parts NaOH from sodium silicate solution=250 (.4) (.243) (1.29)=31.3
3. Parts NaOH added as such=60
4. Parts NaOH total=121.5
5. Parts solid resin=400 (.4)−30=130
6. Parts $SiO_2$=250 (.4) (.757)=75.7

The following are additional examples illustrative of the present invention. The resins used in carrying out the following examples are identified as resins C, D, and E.

Preparation of resin C 2080 grams of 90.41% phenol and 2440 grams of 37.00% formaldehyde were placed in a steam-jacketed reaction kettle. 31 grams of 49.07% NaOH were added and the mixture was heated to refluxing in the next 5 minutes. The solution was refluxed for 1 hour, at which time a sample was found to turn cloudy when cooled to room temperature. This test is made by allowing a drop of resin to fall on a metal plate, which cools it rapidly. When the resin has reached a certain degree of advancement, the cooling causes it to turn cloudy. This degree of advancement is referred to as a "cloud point." The addition of some NaOH to the batch then solubilizes the resin further so that samples remain clear until further advancement occurs. 41 grams of 49.07% NaOH were then added and refluxing was continued. After 15 minutes another cloud point was found and 61.5 grams of 49.07% NaOH were added. After another 15 minutes refluxing, a third cloud point occurred. 72 grams of 49.07% NaOH were added. Refluxing was continued for 5 minutes longer; then 167.5 grams of 49.07% NaOH were added, the mixture was allowed to reflux for 5 minutes longer, and then cooling water was turned into the jacket. As the resin was cooling, 3300 grams of water and 279 grams of 49.07% NaOH were added. When cooled to 25° C., the resin had a viscosity of 260 centipoises, a pH of 11.09, and a specific gravity of 1.120. The total solids content as determined by heating a 1-gram sample for 1¾ hours at 125° C. was 31.5%. The NaOH content (calculated) is 3.78%. The formaldehyde phenol molar ratio is 1.5. When a small sample of the resin was diluted with an excess of ethanol, precipitation resulted.

Preparation of resin D 2080 grams of 90.41% phenol and 2028 grams 37.00% formaldehyde were placed in the resin kettle and 20 grams of 49.07% NaOH were added. During the next 25 minutes the solution was heated to refluxing. Refluxing was continued until a cloud point occurred, which was 57 minutes later. 13.2 grams of 49.07% NaOH were added and after 9 minutes further refluxing, another cloud point was found. 19 grams of 49.07% NaOH were then added and 11 minutes more of refluxing produced another cloud point. 21 grams of 49.07% NaOH were added, and 3 minutes after this the viscosity was found to be 140 centipoises measured at 25° C. 6 minutes further refluxing caused the viscosity to increase to 250 centipoises. 25.2 grams of 49.07% NaOH were added. 4 minutes after this, with the temperature still at refluxing, a sample was taken which had a viscosity of 320 centipoises. Simultaneously cooling water was turned into the jacket. When the resin had been cooled to 25° C. it was found to have a viscosity of 335 centipoises, a pH of 8.81, and a specific gravity of 1.163. The total solids content was 53.8%. The NaOH content (calculated) is 1.15%. The formaldehyde phenol molar ratio is 1.25.

Preparation of resin E

This resin was prepared by the same method used in preparing the resin used in Examples III A and III B except the resin was advanced by aging to a viscosity of only 330 centipoises instead of 345 centipoises.

EXAMPLE XIII

Several 105 gram samples of resin C were diluted to 25% total solids content by using dilute NaOH of different concentrations. 10 grams of the silicate solution [1] was added slowly with stirring to each sample. Mixtures were maintained at 25° C. It was shown that the minimum concentration of NaOH solution which would maintain a clear solution under these conditions was about 6%. 36 grams of the 6% NaOH were used. The following calculation sets forth the total amount of NaOH and the total amount of sodium silicate, the latter expressed as $SiO_2$, for each part of solid resin present in the composition:

Grams NaOH from resin=105(0.0378)=3.9
Grams NaOH from silicate=10(.4)(.243)(1.29)=1.3
Grams NaOH added as such=36(0.06)=2.2
Grams NaOH total=7.4
Grams solid resin=105(.315)−3.9=29.2
Grams $SiO_2$=10(0.4)(.757)=3.0
Parts NaOH per part of solid resin=7.4/29.2=0.25
Parts $SiO_2$ per part of solid resin=3.0/29.2=0.10

EXAMPLE XIV

This experiment was conducted in the same manner as Example XIII except that 55.5 gram samples of resin D were used instead of 105 gram samples of resin C. About the lowest concentration of NaOH solution which would prevent turbidity was 8½%. 112 grams of the NaOH solution were used.

The following calculation sets forth the total amount of NaOH and the total amount of sodium silicate, the latter expressed as $SiO_2$, for each part of solid resin present in the composition:

Grams NaOH from resin=55.5(0.0115)=0.6
Grams NaOH from silicate=10(0.4)(0.243)(1.29)=1.3
Grams NaOH added as such=112(0.085)=9.5
Grams NaOH total=11.4
Grams solid resin=55.5(0.538)−0.6=29.2
Grams $SiO_2$=10(.4)(.757)=3.0
Parts NaOH per part of solid resin=11.4/29.2=0.4
Parts $SiO_2$ per part of solid resin=3.0/29.2=0.10

It is to be noted that the alkali requirement is somewhat higher here than in the previous experiment. This is probably because of the difference in formaldehyde phenol molar ratio and in the degree of advancement of the two resins. In general, it has been found that resins with a high molar ration and high degree of advancement are the most compatible with silicate and, therefore, require less alkali for maintaining homogeneous mixtures.

EXAMPLE XV 80 grams of silicate solution [1] were weighed out. It was found that at least 61 grams of 49.07% NaOH had to be mixed in before 50.6 grams of resin D could be added without causing precipitation when the temperature was maintained at 25° C. The following calculation sets forth the total amount of NaOH and the total amount of sodium silicate, the latter expressed as $SiO_2$, for each part of solid resin present in the composition:

Grams NaOH from resin=(50.6)(0.0115)=0.6
Grams NaOH from silicate=
 (80)(0.4)(0.243)(1.29)=10.0
Grams NaOH added as such=(61)(0.4907)=30.0
Grams NaOH total=40.6
Grams solid resin=(50.6)(0.538)−0.6=26.6
Grams $SiO_2$=(80)(0.4)(0.757)=24.2
Parts NaOH per part of solid resin=40.6/26.6=1.5
Parts $SiO_2$ per part of solid resin=24.2/26.6=0.91

EXAMPLE XVI

The following is an example of an exterior-type adhesive made by using sodium silicate in combination with resin E having a resin solids content of 46.5%. Glue mix No. XVIA utilizes the same resin without sodium silicate. Glue mix No. XVIB does utilize the composition of the present invention comprising the combination of resin and $SiO_2$ kept in solution with NaOH.

Glue mix No. XVIA:
 1000 grams resin E
 160 grams walnut shell flour extender
 160 grams water
Glue mix No. XVIB:
 900 grams resin E
 160 grams water
 100 grams sodium silicate solution (Philadelphia Quartz Co. grade N)
 160 grams walnut shell flour extender The ingredients were added in the order named with thorough stirring after each addition. In mix No. XVIB the water is added earlier in the mix to prevent turbidity when the sodium silicate is added. With the total solids content of the mixture thus reduced by the early addition of the water, the NaOH from the resin and from the sodium silicate is sufficient to prevent turbidity. The viscosities of mixes XVIA and XVIB on a McMichael viscosimeter using a No. 30 wire and 20 R. P. M. rotation were 20 and 24, respectively, at 25° C.

Laboratory tests were conducted in which 3-ply Douglas fir plywood panels were prepared with the two glues under exactly parallel conditions, using 7/16″ construction with ⅛″ faces and 3/16″ cores; 65 lbs. spread per 1000 sq. ft. of plywood; 200 lbs. per sq. in. pressure, 285° F. platen temperature, and a pressing time of 3½

---
[1] Philadelphia Quartz Co. Grade N Silicate of Soda.

minutes. Corresponding plies of corresponding panels were cut from adjacent areas along the grain of a larger veneer sheet so that the variations inherent in wood structure and composition were eliminated as much as possible. Three different assembly times were used, namely, 3 minutes, 10 minutes, and 20 minutes. When submitted to the boiling test (see Commercial Standard CS 45–48 for Douglas Fir Plywood, U. S. Department of Commerce, paragraph 13b) the following results were obtained: The panels prepared with glue mix XVIA showed wood failure of 83%, whereas the panels prepared with glue mix XVIB had a higher percentage of wood failure, namely, a percentage of 86.5. The higher percentage of wood failure using the resin to which the sodium silicate and NaOH had been added indicates there is a decided advantage in utilizing the highly advanced phenol-aldehyde condensation resin to which the sodium silicate and NaOH have been added. The following calculation sets forth the total amount of NaOH and the total amount of sodium silicate, the latter expressed as $SiO_2$, for each part of solid resin present in the composition:

Grams NaOH from resin=900(0.0755)=68.0
Grams NaOH from silicate=
  100(0.4)(0.243)(1.29)=12.5
Grams NaOH total=80.5
Grams solid resin=900(0.40)−68.0=292
Grams $SiO_2$=100(0.40)(0.757)=30
Parts NaOH per part of solid resin=80.5/292=0.28
Parts $SiO_2$ per part of solid resin=30/292=0.10

EXAMPLE XVII

This example is similar to Example XVI except that the extender in this case consists of 50% walnut shell flour and 50% commercial dried soluble blood.

Glue mix No. XVIIA:
    1000 grams resin E
    160 grams extender-mix 10 min.
    20 grams 50% NaOH
    160 grams water-mix 5 min.

Glue mix No. XVIIB:
    860 grams resin E
    160 grams extender-mix 5 min.
    60 grams 50% NaOH
    160 grams water-mix 5 min.
    100 grams sodium silicate solution (Philadelphia Quartz Co. grade N). Add during final 5 min. mixing.

Additional NaOH is used in these mixes because otherwise the thickening effect of the blood would cause too high a glue viscosity, particularly with sodium silicate present. In XVIIB essentially what was done was to substitute 860 grams resin E, 100 grams silicate solution, and 40 grams 50% NaOH for the 1000 grams of resin E used in XVIIA. The mixing procedure was designed to prevent such difficulties as foaming, lumping of blood, and turbidity or precipitation of sodium silicate and resin which might not be adequately redispersed if allowed to occur. None of these difficulties were encountered. The viscosities of mixes XVIIA and XVIIB on a McMichael viscosimeter using a No. 30 wire and 20 R. P. M. rotation were 225 and 156, respectively, at 25° C.

Gluing tests were conducted in the same manner as in Example XVI except that the spread was only about 60 lbs. per 1000 sq. ft. The following results were obtained: the panels prepared with glue mix XVIIA showed wood failure of 90.2%, whereas the panels prepared with glue mix XVIIB had a higher percentage of wood failure, namely, a percentage of 94.8. The higher percentage of wood failure using the resin to which the sodium silicate and NaOH had been added indicates there is a decided advantage in utilizing the highly advanced phenol-aldehyde condensation resin to which the sodium silicate and NaOH have been added.

The following calculation sets forth the total amount of NaOH and the total amount of sodium silicate, the latter expressed as $SiO_2$, for each part of solid resin present in the composition:

Grams NaOH from resin=860(0.0755)=64.9
Grams NaOH from silicate=100(0.4)(0.243)(1.29)=12.5
Grams NaOH added as such=30
Grams NaOH total=107.4
Grams solid resin=860(0.4)−64.9=279.1
Grams $SiO_2$=100(0.4)(0.757)=30
Parts NaOH per part of solid resin=107.4/279.1=0.39
Parts $SiO_2$ per part of solid resin=30/279.1=0.11

It is desired to point out that the present invention is not limited to phenol-aldehyde condensation products prepared by reacting the phenol with formaldehyde. Instead of using formaldehyde, acetaldehyde, benzaldehyde, propionic aldehyde, butyl aldehydes, furfural aldehydes, and the like may be used. Instead of using a single aldehyde, it is within the province of the present invention to react the phenol or mixture of phenols with a mixture of aldehydes as, for example, a mixture of formaldehyde and butyl aldehyde. Di-aldehydes may be used in place of the mono-aldehydes.

In preparing the resin by condensation of a phenol with an aldehyde when phenol per se is used $C_6H_5OH$, it is to be understood that technically pure phenol is preferably used, although impure phenols may be used. It is to be understood that the phenols may contain more than 15% of at least one phenol selected from the group of phenols consisting of orthocresol, orthoxylenol and mixtures thereof.

The term "alkali silicate" as herein used includes sodium, potassium and lithium silicate, all of which may be mixed with the phenol resins herein set forth, and the mixture made homogeneous by adding thereto an alkaline hydroxide, including an alkali hydroxide.

In the various forms of the present invention, the resin solids present in the mixture of resin and the alkali silicate as, for example, a mixture of resin and sodium silicate, is preferably present in the mixture in an amount equivalent to 55% of the weight of the mixture taken on a dry basis. In the examples, each phenol-aldehyde condensation product may contain between 25% and 55% of resin solids and preferably between 30 or 35% and 40% of resin solids. In the silicate of soda used, when it is a grade N silicate of soda having an alkali to silicate ratio of 1:3.22, the silicate of soda contains approximately 40% solids. This can always be calculated from the specific gravity of the silicate of soda and its $Na_2O$ and $SiO_2$ content. For example, grade N silicate of soda is known to have a specific gravity of 41.0° and to consist of 8.90% $Na_2O$ and 28.7% $SiO_2$, and the remainder water. This is close to 40% solids. The percent solids of silicates of soda other than grade N or of any other alkali silicate can be similarly calculated.

The phenol compound herein set forth may be pure phenol using the technical grade thereof or the usual commercial grade cresylic acids of high metacresol content as well as technical metaparacresols. Some ortho compounds may be present. However, the meta compounds are more active than the ortho compounds and as a rule, the phenols should comply with the specifications hereinbefore set forth.

The herein described method M for the production of the resin-reaction product comprises forming the aqueous mixture of a monohydric phenol selected from the group consisting of phenol, cresol, and xylenol, an aldehyde in which the aldehyde group is the sole reactive group, and sodium hydroxide functioning as a catalyst accelerating the formation of the resin-reaction product on heating, said catalyst expressed as sodium hydroxide being present in an amount equivalent to not over 10% of the total mixed constituents; the molar ratio of the aldehyde to the phenol varying from 1:1 to 3:1, heat-reacting said mix and producing a water-soluble phenol-aldehyde reaction product, the viscosity of the latter increasing during this initial reaction period and being indicative of the advancement of the water-soluble resin reaction product toward a stage where the water-soluble state terminates, said aldehyde retaining its activity during the formation of the water-soluble phenol-aldehyde reaction product, reducing the viscosity of the water-soluble reaction product and its tendency to progress to a water-insoluble reaction product by adding thereto sodium hydroxide, and further heating the water-soluble resin to a stage where an aqueous solution of the mass shows a precipitate upon the addition of ethanol, said condensation reaction product remaining water-soluble, said sodium hydroxide increasing the pH of the finally condensed product to between 7.5 and 14, inclusive.

When in the above method the aldehyde is formaldehyde, the method then is designated method M'.

The herein described method N for the production of the resin-reaction product comprises forming an aqueous mixture of a monohydric phenol selected from the group consisting of phenol, cresol, and xylenol, an aldehyde in which the aldehyde group is the sole reactive group, and sodium hydroxide functioning as a catalyst and accelerating the formation of the resin-reaction product on heating, said sodium hydroxide catalyst being present in an amount not over 10% taken on the weight of the monohydric phenol, the molar ratio of the aldehyde to the monohydric phenol varying from 1:1 to 1.5:1, heat-reacting said mix until the resin-reaction product is substantially insoluble in the aqueous alkaline solution as evidenced by the solution becoming cloudy when a sample thereof is cooled to 25° C., adding sodium hydroxide to solubilize the resin-reaction product, and heat-reacting until the resin-reaction product again becomes insoluble in the aqueous alkaline solution as evidenced by a sample of said solution becoming cloudy when cooled to 25° C., and continuing said alternate steps of heat-treating and further condensing the resin until the resin becomes insoluble in the aqueous alkaline solution, and adding sodium hydroxide to solubilize the resin in its alkaline solution, said final resin product then becoming permanently ethanol-soluble and permanently soluble in its aqueous alkaline solution.

When in the above method the aldehyde is formaldehyde, the method is herein designated method N'.

The herein described method P for the production of the resin-reaction product comprises forming an aqueous mixture of a monohydric phenol selected from the group consisting of phenol, cresol, and xylenol, an aldehyde in which the aldehyde group is the sole reactive group, and sodium hydroxide functioning as a catalyst accelerating the formation of the resin-reaction product on heating, said sodium hydroxide catalyst being present in an amount not over 10% taken on the weight of the phenol, the molar ratio of the aldehyde to the phenol varying from 1:1 to 1.5:1, heat-reacting said mix until the resin-reaction product is substantially insoluble in the aqueous alkaline solution as evidenced by the solution becoming cloudy when a sample thereof is cooled to 25° C., adding sodium hydroxide to solubilize the resin-reaction product and heat-reacting until the resin-reaction product again becomes insoluble in the aqueous alkaline solution as evidenced by a sample of said solution becoming cloudy when cooled to 25° C., and continuing said alternate steps of adding sodium hydroxide to solubilize the resin in its alkaline solution and heat-treating and further condensing the resin until the latter is insoluble in its alkaline solution and is ethanol-soluble, then continuing the condensation of the resin until the latter is no longer insoluble in its aqueous alkaline solution but the viscosity of the resin increases, and thereafter subjecting the resulting alkaline solution of the resin to repeated additions of sodium hydroxide with a condensation step in between each addition of sodium hydroxide, each addition thereof functioning to decrease the viscosity of the resin solution which was increased by the condensation step.

When in the above method the aldehyde is formaldehyde, the method is herein designated method P'.

In the production of an adhesive composition in accordance with the present invention, there has been provided a method of inhibiting the separation into separate aqueous layers of an aqueous alkaline mixture of sodium silicate and a heat-reacted thermosetting phenol-aldehyde resin condensation product, said method comprising incorporating in said aqueous mixture sodium hydroxide, the ratio of the ingredients being such that for each part of the resin there is present in solution sodium hydroxide and sodium silicate in amounts equivalent to between 0.25 and 1.50 parts of sodium hydroxide and between 0.10 and 0.91 parts of silicon dioxide, said monohydric phenol-aldehyde reaction product being selected from the group of reaction products produced by the herein described methods M, N and P, and M', N', and P'. The resin solids content of each of the thermosetting phenol-aldehyde resin condensation products in its aqueous alkaline solution is broadly between about 25% and about 55%, although in some cases the resin solids content may be as low as 20%.

The present application is a continuation-in-part of application Serial No. 146,992, filed March 1, 1950, and allowed May 22, 1953, now abandoned.

The phenol-aldehyde resins produced in accordance with the disclosure of Redfern Reissue Patent No. 23,347 and U. S. Patents No. 2,631,097 and No. 2,631,098 have an average molecular weight, as determined by diffusion coefficients, in the range of 40,000 to 50,000. This contrasts with the average molecular weight of the prior art phenol-aldehyde resins which is in the range of 2,000 to 3,000. The present invention is, therefore, applicable to any phenol-aldehyde or more specifically, any phenol-formaldehyde resin having a molecular weight between the limits of 40,000 and 50,000.

What is claimed is:

1. In the production of an adhesive composition, the method of inhibiting the separation into separate aqueous layers of an aqueous alkaline mixture of sodium silicate and a heat-reacted thermosetting phenol-aldehyde resin condensation product; said method comprising incorporating in said aqueous adhesive mixture, sodium hydroxide, the ratio of the ingredients being such that for each part of the resin there is present in solution sodium hydroxide and sodium silicate in amounts equivalent to between 0.25 and 1.50 parts of sodium hydroxide, and between 0.10 and 0.91 parts of silicon dioxide, said phenol-aldehyde reaction-product being selected from the group of reaction products produced by (a) forming an aqueous mixture of a monohydric phenol selected from the group consisting of phenol, cresol, and xylenol, an aldehyde in which the aldehyde group is the sole reactive group, and a sodium hydroxide catalyst accelerating the formation of the resin-reaction product on heating, said catalyst being present in an amount not over 10% of the total mix constituents, the molar ratio of the aldehyde to the phenol being between the limits of 1:1 to 3:1, heat-reacting said mix and producing a water-soluble phenol-aldehyde reaction product, the viscosity of the latter increasing during the initial reaction period and being indicative of the advancement of the water-soluble reaction product toward the stage where the water-soluble state terminates, said aldehyde retaining its activity during the formation of the water-soluble phenol-aldehyde reaction product, reducing the viscosity of the water-soluble reaction product and its tendency to progress to a water-insoluble product by adding thereto sodium hydroxide, and further heating the water-soluble resin to a stage where an aqueous solution of the mass shows a precipitate upon the addition of ethanol, said condensation product remaining water-soluble, said sodium hydroxide increasing the pH of the final condensed product to between 7.5 and 14, inclusive; (b) forming an aqueous mixture of a monohydric phenol selected from the group consisting of phenol, cresol, and xylenol, an aldehyde in which the aldehyde group is the sole reactive group, and a sodium hydroxide catalyst accelerating the formation of the resin-reaction product on heating, said catalyst being present in an amount not over 10% taken on the weight of the monohydric phenol, the molar ratio of the aldehyde to the monohydric phenol being between the limits of 1:1 to 1.5:1, heat-reacting said mix until the resin-reaction product is substantially insoluble in the aqueous alkaline solution as evidenced by the solution becoming cloudy when a sample thereof is cooled to 25° C., adding sodium hydroxide to solubilize the resin-reaction product, heat-reacting until the resin-reaction product again becomes insoluble in the aqueous alkaline solution as evidenced by a sample of said solution becoming cloudy when cooled to 25° C., and continuing said alternate steps of heat-treating and further condensing the resin until the resin becomes insoluble in the aqueous alkaline solution, and adding sodium hydroxide to solubilize the resin in its alkaline solution, said final resin product then being permanently ethanol-soluble and permanently soluble in its aqueous alkaline solution; and (c) forming an aqueous mixture of a monohydric phenol selected from the group consisting of phenol, cresol, and xylenol, an aldehyde in which the aldehyde group is the sole reactive group, and a sodium hydroxide catalyst accelerating the formation of the resin-reaction product on heating, said sodium hydroxide catalyst being present in an amount not over 10% taken on the weight of the phenol, the molar ratio of the aldehyde to the phenol being between the limits of 1:1 to 1.5:1, heat-reacting said mix until the resin-reaction product is substantially insoluble in the aqueous alkaline solution as evidenced by the solution becoming cloudy when a sample thereof is cooled to 25° C., adding alkali metal hydroxide to solubilize the resin-reaction product, heat-reacting until the resin-reaction product again becomes insoluble in the aqueous alkaline solution as evidenced by a sample of said solution becoming cloudy when cooled to 25° C., continuing said alternate steps of adding sodium hydroxide to solubilize the resin-reaction product in its alkaline solution and heat-treating and further condensing until the resin is insoluble in its alkaline solution and is ethanol soluble, continuing the condensation of the resin until the viscosity of the resin in its alkaline solution increases, and thereafter subjecting the resulting alkaline solution of the resin to repeated additions of sodium hydroxide with a condensation step in between each addition of alkali metal hydroxide, each addition thereof functioning to decrease the viscosity of the resin solution which was increased by the condensation step.

2. The product of the method of claim 1.

3. In the production of an adhesive composition, the method of inhibiting the separation into separate aqueous layers of an aqueous alkaline mixture of sodium silicate and a heat-reacted thermosetting phenol-aldehyde resin condensation product, the resin solids concentration of the latter in its aqueous alkaline solution being between 25% and 55%, said method comprising incorporating in said aqueous mixture sodium hydroxide, the ratio of the ingredients being such that for each part of the resin present there is present in solution sodium hydroxide and sodium silicate in an amount equivalent to between 0.25 and 1.50 parts of sodium hydroxide, and between 0.10 and 0.91 parts of silicon dioxide, said phenol-aldehyde reaction product being selected from the group of reaction products produced by (a) forming an aqueous mixture of a monohydric phenol selected from the group consisting of phenol, cresol, and xylenol, an aldehyde in which the aldehyde group is the sole reactive group, and a sodium hydroxide catalyst accelerating the formation of the resin-reaction product on heating, said catalyst being present in an amount not over 10% of the total mix constituents, the molar ratio of the aldehyde to the phenol being between the limits of 1:1 to 3:1, heat-reacting said mix and producing a water-soluble phenol-aldehyde reaction product, the viscosity of the latter increasing during the initial reaction period and being indicative of the advancement of the water-soluble reaction product toward the stage where the water-soluble state terminates, said aldehyde retaining its activity during the formation of the water-soluble phenol-aldehyde reaction product, reducing the viscosity of the water-soluble reaction product and its tendency to progress to a water-insoluble product by adding thereto sodium hydroxide, and further heating the water-soluble resin to a stage where an aqueous solution of the mass shows a precipitate upon the addition of ethanol, said condensation product remaining water-soluble, said sodium hydroxide increasing the pH of the final condensed product to between 7.5 and 14, inclusive; (b) forming an aqueous mixture of a monohydric phenol selected from the group consisting of phenol, cresol, and xylenol, an aldehyde in which the aldehyde group is the sole reactive group, and a sodium hydroxide catalyst accelerating the formation of the resin-reaction product on heating, said catalyst being present in an amount not over 10% taken on the weight of the monohydric phenol, the molar ratio of the aldehyde to the monohydric phenol being between the limits of 1:1 to 1.5:1, heat-reacting said mix until the resin-reaction product is substantially insoluble in the aqueous alkaline solution as evidenced by the solution becoming cloudy when a sample thereof is cooled to 25° C., adding sodium hydroxide to solubilize the resin-reaction product, heat-reacting until the resin-reaction product again becomes insoluble in the aqueous alkaline solution as evidenced by a sample of said solution becoming cloudy when cooled to 25° C., and continuing said alternate steps of heat-treating and further condensing the resin until the resin becomes insoluble in the aqueous alkaline solution, and adding sodium hydroxide to solubilize the resin in its alkaline solution, said final resin product then being permanently ethanol-soluble and permanently soluble in its aqueous alkaline solution; and (c) forming an aqueous mixture of a monohydric phenol selected from the group consisting of phenol, cresol, and xylenol, an aldehyde in which the aldehyde group is the sole reactive group, and a sodium hydroxide catalyst accelerating the formation of the resin-reaction product on heating, said sodium hydroxide catalyst being present in an amount not over 10% taken on the weight of the phenol, the molar ratio of the aldehyde to the phenol being between the limits of 1:1 to 1.5:1, heat-reacting said mix until the resin-reaction product is substantially insoluble in the aqueous alkaline solution as evidenced by the solution becoming cloudy when a sample thereof is cooled to 25° C., adding alkali metal hydroxide to solubilize the resin-reaction product, heat-reacting until the resin-reaction product again becomes insoluble in the aqueous alkaline solution as evidenced by a sample of said solution becoming cloudy when cooled to 25° C., continuing said alternate steps of adding sodium hydroxide to solubilize the resin-reaction product in its alkaline solution and heat-treating and further condensing until the resin is insoluble in its alkaline solution and is ethanol soluble, continuing the condensation of the resin until the viscosity of the resin in its alkaline solution increases, and thereafter subjecting the resulting alkaline solution of the resin to repeated additions of sodium hydroxide with a condensation step in between each addition of alkali metal hydroxide, each addition thereof functioning to decrease the viscosity of the resin solution which was increased by the condensation step.

4. The product of the method defined in claim 3.

5. In the production of an adhesive composition, the method of inhibiting the separation into separate aqueous layer of an aqueous alkaline mixture of sodium silicate and a heat-reacted thermosetting phenol-formaldehyde resin condensation product, said method comprising incorporating in said aqueous adhesive mixture, sodium hydroxide, the ratio of the ingredients being such that for each part of the resin there is present in solution sodium hydroxide and sodium silicate in an amount equivalent to between 0.25 and 1.50 parts of sodium hydroxide, and between 0.10 and 0.91 parts of silicon dioxide, said phenol-formaldehyde reaction product being selected from the group of reaction products produced by (a) forming an aqueous mixture of a monohydric phenol selected from the group consisting of phenol, cresol, and xylenol; formaldehyde, and a sodium hydroxide catalyst accelerating the formation of the resin-reaction product on heating, said catalyst being present in an amount not over 10% of the total mix constituents, the molar ratio of the formaldehyde to the phenol being between the limits of 1:1 to 3:1, heat-reacting said mix and producing a water-soluble phenol-formaldehyde reaction product, the viscosity of the latter increasing during the initial reaction period and being indicative of the advancement of the water-soluble reaction product toward the stage where the water-soluble state terminates, said formaldehyde retaining its activity during the formation of the water-soluble phenol-formaldehyde reaction product, reducing the viscosity of the water-soluble reaction product and its tendency to progress to a water-insoluble product by adding thereto sodium hydroxide, and further heating the water-soluble resin to a stage where an aqueous solution of the mass shows a precipitate upon the addition of ethanol, said condensation product remaining water-soluble, said sodium hydroxide increasing the pH of the final condensed product to between 7.5 and 14 inclusive; (b) forming an aqueous mixture of a monohydric phenol selected from the group consisting of phenol, cresol, and xylenol; formaldehyde, and a sodium hydroxide catalyst accelerating the formation of the resin-reaction product on heating, said catalyst being present in an amount not over 10% taken on the weight of the monohydric phenol, the molar ratio of the formaldehyde to the phenol being between the limits of 1:1 to 1.5:1, heat-reacting said mix until the resin-reaction product is substantially insoluble in the aqueous alkaline solution as evidenced by the solution becoming cloudy when a sample thereof is cooled to 25° C., adding sodium hydroxide to solubilize the resin-reaction product, heat-reacting until the resin reaction product again becomes insoluble in the aqueous alkaline solution as evidenced by a sample of said solution becoming cloudy when cooled to 25° C., and continuing said alternate steps of heat-treating and further condensing the resin until the resin becomes insoluble in the aqueous alkaline solution, and adding sodium hydroxide to solubilize the resin in its alkaline solution, said final resin product then being permanently ethanol-soluble and permanently soluble in its aqueous alkaline solution; and (c) forming an aqueous mixture of a monohydric phenol selected from the group consisting of phenol, cresol, and xylenol; formaldehyde, and a sodium hydroxide catalyst accelerating the formation of the resin-reaction product on heating, said sodium hydroxide catalyst being present in an amount not over 10% taken on the weight of the phenol, the molar ratio of the formaldehyde to the phenol being between the limits of 1:1 to 1.5:1, heat-reacting said mix until the resin-reaction product is substantially insoluble in the aqueous alkaline solution as evidenced by the solution becoming cloudy when a sample thereof is cooled to 25° C., adding alkali metal hydroxide to solubilize the resin-reaction product, heat-reacting until the resin-reaction product again becomes insoluble in the aqueous alkaline solution as evidenced by a sample of said solution becoming cloudy when cooled to 25° C., continuing said alternate steps of adding sodium hydroxide to solubilize the resin-reaction product in its alkaline solution and heat-treating and further condensing until the resin is insoluble in its alkaline solution and is ethanol soluble, continuing the condensation of the resin until the viscosity of the resin in its alkaline solution increases, and thereafter subjecting the resulting alkaline solution of the resin to repeated additions of sodium hydroxide with a condensation step in between each addition of alkali metal hydroxide, each addition thereof functioning to decrease the viscosity of the resin solution which was increased by the condensation step.

6. The product of the method defined in claim 5.

7. In the production of an adhesive composition, the method of inhibiting the separation into separate aqueous layers of an aqueous alkaline mixture of sodium silicate and a heat-reacted thermosetting phenol-aldehyde resin condensation product, said adhesive composition having present blood in an amount to thicken the composition in the presence of the sodium hydroxide, and a blood anti-oxidation agent acting to reduce the oxidation of the blood during the spreading of the adhesive on use thereof, said method comprising incorporating in said adhesive mixture sodium hydroxide, the ratio of the ingredients being such that for each part of the resin there is present in solution sodium hydroxide and sodium silicate in amounts equivalent to between 0.25 and 1.50 parts of sodium hydroxide, and between 0.10 and 0.91 parts of silicon dioxide, said phenol-aldehyde reaction-product being selected from the group of reaction-products produced by (a) forming an aqueous mixture of a monohydric phenol selected from the group consisting of phenol, cresol, and xylenol, an aldehyde in which the aldehyde group is the sole reactive group, and a sodium hydroxide catalyst accelerating the formation of the resin-reaction product on heating, said catalyst being present in an amount not over 10% of the total mix constituents, the molar ratio of the aldehyde to the phenol being between the limits of 1:1 to 3:1, heat-reacting said mix and producing a water-soluble phenol-aldehyde reaction product, the viscosity of the latter increasing during the initial reaction period and being indicative of the advancement of the water-soluble reaction product toward the stage where the water-soluble state terminates, said aldehyde retaining its activity during the formation of the water-soluble phenol-aldehyde reaction product, reducing the viscosity of the water-soluble reaction product and its tendency to progress to a water-insoluble product by adding thereto sodium hydroxide, and further heating the water-soluble resin to a stage where an aqueous solution of the mass shows a precipitate upon the addition of ethanol, said condensation product remaining water-soluble, said sodium hydroxide increasing the pH of the final condensed product to between 7.5 and 14, inclusive; (b) forming an aqueous mixture of a monohydric phenol selected from the group consisting of phenol, cresol, and xylenol, an aldehyde in which the aldehyde group is the sole reactive group, and a sodium hydroxide catalyst accelerating the formation of the resin-reaction product on heating, said catalyst being present in an amount not over 10% taken on the weight of the monohydric phenol, the molar ratio of the aldehyde to the monohydric phenol being between the limits of 1:1 to 1.5:1, heat-reacting said mix until the resin-reaction product is substantially insoluble in the aqueous alkaline solution as evidenced by the solution becoming cloudy when a sample thereof is cooled to 25° C., adding sodium hydroxide to solubilize the resin-reaction product, heat-reacting until the resin-reaction product again becomes insoluble in the aqueous alkaline solution as evidenced by a sample of said solution becoming cloudy when cooled to 25° C., and continuing said alternate steps of heat-treating and further condensing the resin until the resin becomes insoluble in the aqueous alkaline solution, and adding sodium hydroxide to solubilize the resin in its alkaline solution, said final resin product then being permanently ethanol-soluble and permanently soluble in its aqueous alkaline solution; and (c) forming an aqueous mixture of a monohydric phenol selected from the group consisting of phenol, cresol, and xylenol, an aldehyde in which the aldehyde group is the sole reactive group, and a sodium hydroxide catalyst accelerating the formation of the resin-reaction product on heating, said sodium hydroxide catalyst being present in an amount not over 10% taken on the weight of the phenol, the molar ratio of the aldehyde to the phenol being between the limits of 1:1 to 1.5:1, heat-reacting said mix until the resin-reaction product is substantially insoluble in the aqueous alkaline solution as evidenced by the solution becoming cloudy when a sample thereof is cooled to 25° C., adding alkali metal hydroxide to solubilize the resin-reaction product, heat-reacting until the resin-reaction product again becomes insoluble in the aqueous alkaline solution as evidenced by a sample of said solution becoming cloudy when cooled to 25° C., continuing said alternate steps of adding sodium hydroxide to solubilize the resin-reaction product in its alkaline solution and heat-treating and further condensing until the resin is insoluble in its alkaline solution and is ethanol soluble, continuing the condensation of the resin until the viscosity of the resin in its alkaline solution increases, and thereafter subjecting the resulting alkaline solution of the resin to repeated additions of sodium hydroxide with a condensation step in between each addition of alkali metal hydroxide, each addition thereof functioning to decrease the viscosity of the resin solution which was increased by the condensation step.

8. The product of the method defined in claim 7.

9. In the production of an adhesive composition, the method of inhibiting the separation into separate aqueous layers of an aqueous alkaline mixture of sodium silicate and a heat-reacted thermosetting phenol-formaldehyde resin condensation product, said adhesive composition having present blood in an amount to thicken the composition in the presence of the sodium hydroxide, and a blood antioxidation agent acting to reduce the oxidation of the blood during the spreading of the adhesive on use thereof, said method comprising incorporating in said adhesive mixture sodium hydroxide, the ratio of the ingredients being such that for each part of the resin there is present in solution sodium hydroxide and sodium silicate in amounts equivalent to between 0.25 and 1.50 parts of sodium hydroxide, and between 0.10 and 0.91 parts of silicon dioxide, said phenol-formaldehyde reaction-product being selected from the group of reaction-products produced by (a) forming an aqueous mixture of a monohydric phenol selected from the group consisting of phenol, cresol, and xylenol; formaldehyde, and a sodium hydroxide catalyst accelerating the formation of the resin-reaction product on heating, said catalyst being present in an amount not over 10% of the total mix constituents, the molar ratio of the formaldehyde to the phenol being between the limits of 1:1 to 3:1, heat-reacting said mix and producing a water-soluble phenol-formaldehyde reaction product, the viscosity of the latter increasing during the initial reaction period and being indicative of the advancement of the water-soluble reaction product toward the stage where the water-soluble state terminates, said formaldehyde retaining its activity during the formation of the water-soluble phenol-formaldehyde reaction product, reducing the viscosity of the water-soluble reaction product and its tendency to progress to a water-insoluble product by adding thereto sodium hydroxide, and further heating the water-soluble resin to a stage where an aqueous solution of the mass shows a precipitate upon the addition of ethanol, said condensation product remaining water-soluble, said sodium hydroxide increasing the pH of the final condensed product to between 7.5 and 14 inclusive; (b) forming an aqueous mixture of a monohydric phenol selected from the group consisting of phenol, cresol, and xylenol; formaldehyde, and a sodium hydroxide catalyst accelerating the formation of the resin-reaction product on heating, said catalyst being present in an amount not over 10% taken on the weight of the monohydric phenol, the molar ratio of the formaldehyde to the phenol being between the limits of 1:1 to 1.5:1, heat-reacting said mix until the resin-reaction product is substantially insoluble in the aqueous alkaline solution as evidenced by the solution becoming cloudy when a sample thereof is cooled to 25° C., adding sodium hydroxide to solubilize the resin-reaction product, heat-reacting until the resin-reaction product again becomes insoluble in the aqueous alkaline solution as evidenced by a sample of said solution becoming cloudy when cooled to 25° C., and continuing said alternate steps of heat-treating and further condensing the resin until the resin becomes insoluble in the aqueous alkaline solution, and adding sodium hydroxide to solubilize the resin in its alkaline solution, said final resin product then being permanently ethanol-soluble and permanently soluble in its aqueous alkaline solution; and (c) forming an aqueous mixture of a monohydric phenol selected from the group consisting of phenol, cresol, and xylenol; formaldehyde, and a sodium hydroxide catalyst accelerating the formation of the resin-reaction product on heating, said sodium hydroxide catalyst being present in an amount not over 10% taken on the weight of the phenol, the molar ratio of the formaldehyde to the phenol being between the limits of 1:1 to 1.5:1, heat-reacting said mix until the resin-reaction product is substantially insoluble in the aqueous alkaline solution as evidenced by the solution becoming cloudy when a sample thereof is cooled to 25° C., adding alkali metal hydroxide to solubilize the resin-reaction product, heat-reacting until the resin-reaction product again becomes insoluble in the aqueous alkaline solution as evidenced by a sample of said solution becoming cloudy when cooled to 25° C., continuing said alternate steps of adding sodium hydroxide to solubilize the resin-reaction product in its alkaline solution and heat-treating and further condensing until the resin is insoluble in its alkaline solution and is ethanol soluble, continuing the condensation of the resin until the viscosity of the resin in its alkaline solution increases, and thereafter subjecting the resulting alkaline solution of the resin to repeated additions of sodium hydroxide with a condensation step in between each addition of alkali metal hydroxide, each addition thereof functioning to decrease the viscosity of the resin solution which was increased by the condensation step.

10. The product of the method defined in claim 9.

11. In the production of an adhesive composition, the method of inhibiting the separation into separate aqueous layers of an aqueous alkaline mixture of sodium silicate and a heat-reacted thermosetting phenol-aldehyde resin condensation product, the resin solids concentration of the latter in its aqueous alkaline solution being between 25% and 55%, said adhesive composition having present blood in an amount to thicken the composition in the presence of the sodium hydroxide, and a blood anti-oxidation agent acting to reduce the oxidation of the blood during the spreading of the adhesive on use thereof, said method comprising incorporating in said adhesive mixture sodium hydroxide, the ratio of the ingredients being such that for each part of the resin there is present in solution sodium hydroxide and sodium silicate in amounts equivalent to between 0.25 and 1.50 parts of sodium hydroxide, and between 0.10 and 0.91 parts of silicon dioxide, said phenol-aldehyde reaction-product being selected from the group of reaction-products produced by (a) forming an aqueous mixture of a monohydric phenol selected from the group consisting of phenol, cresol, and xylenol, an aldehyde in which the aldehyde group is the sole reactive group, and a sodium hydroxide catalyst accelerating the formation of the resin-reaction product on heating, said catalyst being present in an amount not over 10% of the total mix constituents, the molar ratio of the aldehyde to the phenol being between the limits of 1:1 to 3:1, heat-reacting said mix and producing a water-soluble phenol-aldehyde reaction product, the viscosity of the latter increasing during the initial reaction period and being indicative of the advancement of the water-soluble reaction product toward the stage where the water-soluble state terminates, said aldehyde retaining its activity during the formation of the water-soluble phenol-aldehyde reaction product, reducing the viscosity of the water-soluble reaction product and its tendency to progress to a water-insoluble product by adding thereto sodium hydroxide, and further heating the water-soluble resin to a stage where an aqueous solution of the mass shows a precipitate upon the addition of ethanol, said condensation product remaining water-soluble, said sodium hydroxide increasing the pH of the final condensed product to between 7.5 and 14, inclusive; (b) forming an aqueous mixture of a monohydric phenol selected from the group consisting of phenol, cresol, and xylenol, an aldehyde in which the aldehyde group is the sole reactive group, and a sodium hydroxide catalyst accelerating the formation of the resin-reaction product on heating, said catalyst being present in an amount not over 10% taken on the weight of the monohydric phenol, the molar ratio of the aldehyde to the monohydric phenol being between the limits of 1:1 to 1.5:1, heat-reacting said mix until the resin-reaction product is substantially insoluble in the aqueous alkaline solution as evidenced by the solution becoming cloudy when a sample thereof is cooled to 25° C., adding sodium hydroxide to solubilize the resin-reaction product, heat-reacting until the resin-reaction product again becomes insoluble in the aqueous alkaline solution as evidenced by a sample of said solution becoming cloudy when cooled to 25° C., and continuing said alternate steps of heat-treating and further condensing the resin until the resin becomes insoluble in the aqueous alkaline solution, and adding sodium hydroxide to solubilize the resin in its alkaline solution, said final resin product then being permanently ethanol-soluble and permanently soluble in its aqueous solution; and (c) forming an aqueous mixture of a monohydric phenol selected from the group consisting of phenol, cresol, and xylenol, an aldehyde in which the aldehyde group is the sole reactive group, and a sodium hydroxide catalyst accelerating the formation of the resin-reaction product on heating, said sodium hydroxide catalyst being present in an amount not over 10% taken on the weight of the phenol, the molar ratio of the aldehyde to the phenol being between the limits of 1:1 to 1.5:1, heat-reacting said mix until the resin-reaction product is substantially insoluble in the aqueous alkaline solution as evidenced by the solution becoming cloudy when a sample thereof is cooled to 25° C., adding alkali metal hydroxide to solubilize the resin-reaction product, heat-reacting until the resin-reaction product again becomes insoluble in the aqueous alkaline solution as evidenced by a sample of said solution becoming cloudy when cooled to 25° C., continuing said alternate steps of adding sodium hydroxide to solubilize the resin-reaction product in its alkaline solution and heat-treating and further condensing until the resin is insoluble in its alkaline solution and is ethanol soluble, continuing the condensation of the resin until the viscosity of the resin in its alkaline solution increases, and thereafter subjecting the resulting alkaline solution of the resin to repeated additions of sodium hydroxide with a condensation step in between each addition of alkali metal hydroxide, each addition thereof functioning to decrease the viscosity of the resin solution which was increased by the condensation step.

12. The method defined in claim 11 in which the aldehyde is formaldehyde.

13. The product of the method defined in claim 11.

14. In the production of an adhesive composition, the method of inhibiting the separation into separate aqueous layers of an aqueous alkaline mixture of sodium silicate and a heat-reacted thermosetting phenol-aldehyde resin condensation product; said method comprising incorporating in said aqueous adhesive mixture, sodium hydroxide, the ratio of the ingredients being such that for each part of the resin there is present in solution sodium hydroxide and sodium silicate in amounts equivalent to between 0.25 and 1.50 parts of sodium hydroxide, and between 0.10 and 0.91 parts of silicon dioxide, said phenol-aldehyde reaction-product being produced by forming an aqueous mixture of a monohydric phenol selected from the group consisting of phenol, cresol, and xylenol; an aldehyde in which the aldehyde group is the sole reactive group, and a sodium hydroxide catalyst accelerating the formation of the resin-reaction product on heating, said catalyst being present in an amount not over 10% of the total mix constituents, the molar ratio of the aldehyde to the phenol being between the limits of 1:1 to 3:1, heat-reacting said mix and producing a water-soluble phenol-aldehyde reaction product, the viscosity of the latter increasing during the initial reaction period and being indicative of the advancement of the water-soluble reaction product toward the stage where the water-soluble state terminates, said aldehyde retaining its activity during the formation of the water-soluble phenol-aldehyde reaction product, reducing the viscosity of the water-soluble reaction product and its tendency to progress to a water-insoluble product by adding thereto sodium hydroxide, and further heating the water-soluble resin to a stage where an aqueous solution of the mass shows a precipitate upon the addition of ethanol, said condensation product remaining water soluble, said sodium hydroxide increasing the pH of the final condensed product to between 7.5 and 14 inclusive.

15. In the production of an adhesive composition, the method of inhibiting the separation into separate aqueous layers of an aqueous alkaline mixture of sodium silicate and a heat-reacted thermosetting phenol-aldehyde resin condensation product; said method comprising incorporating in said aqueous adhesive mixture, sodium hydroxide, the ratio of the ingredients being such that for each part of the resin there is present in solution sodium hydroxide and sodium silicate in amounts equivalent to between 0.25 and 1.50 parts of sodium hydroxide, and between 0.10 and 0.91 parts of silicon dioxide, said phenol-aldehyde reaction product being produced by forming an aqueous mixture of a monohydric phenol selected from the group consisting of phenol, cresol, and xylenol, an aldehyde in which the aldehyde group is the sole reactive group, and a sodium hydroxide catalyst accelerating the formation of the resin-reaction product on heating, said catalyst being present in an amount not over 10% taken on the weight of the monohydric phenol, the molar ratio of the aldehyde to the monohydric phenol being between the limits of 1:1 to 1.5:1, heat-reacting said mix until the resin-reaction product is substantially insoluble in the aqueous alkaline solution as evidenced by the solution becoming cloudy when a sample thereof is cooled to 25° C., adding sodium hydroxide to solubilize the resin-reaction product, heat-reacting until the resin-reaction product again becomes insoluble in the aqueous alkaline solution as evidenced by a sample of said solution becoming cloudy when cooled to 25° C., and continuing said alternate steps of heat-treating and further condensing the resin until the resin becomes insoluble in the aqueous alkaline solution, and adding sodium hydroxide to solubilize the resin in its alkaline solution, said final resin product then being permanently ethanol-soluble and permanently soluble in its aqueous alkaline solution.

References Cited in the file of this patent

UNITED STATES PATENTS

| Re. 23,347 | Redfern | Mar. 20, 1940 |
| 2,223,392 | Smith | Dec. 3, 1940 |
| 2,291,586 | Galber et al. | July 28, 1942 |
| 2,292,624 | Fawthrop | Aug. 11, 1942 |
| 2,430,736 | Redfern | Nov. 11, 1947 |